US008332125B2

(12) United States Patent
Boee et al.

(10) Patent No.: US 8,332,125 B2
(45) Date of Patent: Dec. 11, 2012

(54) METHOD FOR CONTROLLING AT LEAST ONE SOLENOID VALVE

(75) Inventors: Matthias Boee, Kornwestheim (DE); Helerson Kemmer, Vaihingen (DE); Anh-Tuan Hoang, Tamm (DE); Achim Deistler, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 999 days.

(21) Appl. No.: 12/296,625

(22) PCT Filed: Mar. 20, 2007

(86) PCT No.: PCT/EP2007/052645

§ 371 (c)(1), (2), (4) Date: Dec. 5, 2008

(87) PCT Pub. No.: WO2007/118750

PCT Pub. Date: Oct. 25, 2007

(65) Prior Publication Data

US 2011/0106404 A1 May 5, 2011

(30) Foreign Application Priority Data

Apr. 11, 2006 (DE) ......................... 10 2006 016 892

(51) Int. Cl.

| | |
|---|---|
| ***B60T 7/12*** | (2006.01) |
| ***G05D 1/00*** | (2006.01) |
| ***G06F 7/00*** | (2006.01) |
| ***G06F 17/00*** | (2006.01) |
| ***F02M 51/00*** | (2006.01) |

(52) U.S. Cl. ........................................ 701/103; 123/490

(58) Field of Classification Search ................... 701/103

See application file for complete search history.

(56) References Cited

U.S. PATENT DOCUMENTS

| | | | | |
|---|---|---|---|---|
| 4,180,026 A | 12/1979 | Schulzke et al. | | |
| 6,250,286 B1 * | 6/2001 | Hoenig et al. | ................ | 123/490 |
| 6,390,082 B1 * | 5/2002 | Duffy et al. | .................... | 123/682 |
| 6,785,112 B2 * | 8/2004 | Reischl et al. | ................ | 361/154 |

FOREIGN PATENT DOCUMENTS

| | | |
|---|---|---|
| DE | 198 33 330 | 1/2000 |
| DE | 198 33 830 | 2/2000 |
| EP | 0 893 594 | 1/1999 |
| EP | 1 396 630 | 3/2004 |
| EP | 1396630 | * 10/2004 |
| GB | 2 025 183 | 1/1980 |

* cited by examiner

*Primary Examiner* — Stephen K Cronin
*Assistant Examiner* — Sherman Manley
(74) *Attorney, Agent, or Firm* — Merchant & Gould P.C.

(57) ABSTRACT

Described is a method for controlling a magnet valve for controlling the injection of fuel into an internal combustion engine, which method permits precise fuel metering in the no-load running or in the lower partial load range without changes to the hardware of the fuel injection system being necessary.

9 Claims, 2 Drawing Sheets

METHOD FOR CONTROLLING AT LEAST ONE SOLENOID VALVE

TECHNICAL FIELD

DE 198 33 330 provides a procedure for controlling at least one magnet valve that serves for controlling the injection of fuel into a combustion engine. Thereby the magnet valve is impinged with a booster voltage at the beginning of a controlling that is increased as opposed to a further controlling. This increased booster voltage provides a faster opening of the magnet valve. In a second phase the magnet valve is controlled by a locked rotor current, which causes a secure opening of the magnet valve. As soon as the magnet valve is opened, the current that is controlled with the magnet valve can be reduced. This current that flows in a third phase is called holding current.

BACKGROUND

The circuit arrangement of the controlling of the magnet valve is described in detail in DE 198 33 830. Because the procedure according to this invention does not require any hardware changes compared to the controlling that is described in DE 198 33 330, it will be referred to the hardware description in DE 198 33 330.

Several exemplars of magnet valves and injectors that are structurally identically produced in series provide a scattering in their operational behavior, which causes especially during partial load and no-load running that different fuel amounts are injected in the several cylinders of a combustion engine. Thereby the run-out and the pollutant emissions of the combustion engine get worse.

SUMMARY

The invention is based on the task to provide a procedure, which allows an increased accuracy at the fuel metering and thereby an improved run-out of the combustion engine and low emissions especially in the lower partial load range or in the no-load running.

At a procedure for controlling at least one magnet valve, which serves for controlling the injection of fuel into a combustion engine, whereby the magnet valve is impinged at the beginning of the controlling with a higher voltage as opposed to a further controlling, and whereby the magnet valve is impinged at the end of the controlling with a holding current, this task is solved by at least one default control variable, which influences the energy and/or the efficiency, with which the magnet valve is impinged at the end of the controlling, depending on at least one operating parameter of the combustion engine.

Among others the invention takes advantage of the realization that the pressure is relatively low in the common-rail during a low partial load and during a no-load running. Therefore the holding current for example can be reduced so that less energy is stored in the opened magnet valve. Thereby the closing time of the magnet valves and also of the injectors that are operated by the magnet valves is minimized, so that the finishing of the injection process takes place with a higher accuracy. By the procedure according to this invention the injection time is influenced in a minor extent than at regular procedures of manufacturing related series scatterings of the magnet valves and the injectors. As a result of this the scattering of the injection amount is lower at an identical controlling of several magnet valves or injectors that have been produced in series and the precision, with which a requested fuel amount is injected, increases.

A further advantage of the invention is that the electric efficiency, which is required for the operation of the magnet valve, can be reduced, so that the control unit and the output stages that are located in the control unit can be discharged.

Furthermore an advantage of the invention can be seen in the fact that the hardware of control unit and also of the injectors or the magnet valves in the injectors of a combustion engine does not require any changes. The invention can therefore be realized cost-effectively by changing the computer program that is running in the control unit. Thereby it is also possible to apply the invention at control unit that have been produced in series by a change of the computer program that is running in the control unit.

It proved to be very advantageous if the control variable of the magnet valve is lowered to a reduced value at the end of the controlling as opposed to an initial value during partial or full load operation of the combustion engine, if at least one operating parameter of the combustion engine falls below a first default threshold value.

Furthermore it proved to be advantageous if the control variable of the magnet valve is raised at the end of the controlling on to the initial value during the partial or full load operation of the combustion engine, when at least one operating parameter of the combustion engine exceeds a second default threshold value. By using these different threshold values for lowering the control variable and for the following raising of the control variable on the value that is designated for the partial or full load operation of the combustion engine, a so-called hysteresis is established, which reliably prevents that the control variable jumps back and forth between two different values, namely the normal value and the lowered value.

In a further advantageous addition of the invention it is provided that the increased control voltage is further raised or kept longer on the increased level at the beginning of the controlling of the magnet valve as opposed to an initial value during partial or full load operation of the combustion engine, if at least one operating parameter of the combustion engine falls below a first default threshold value. Thereby a so-called increased and/or longer efficient booster current flows through the magnet valve at the beginning of the controlling, which leads to a faster and safer opening of the magnet valve. Because the engine speed of the combustion engine is naturally lower during no-load running, sufficient enough time is provided between the different injections in order to charge a booster condenser on to the increased control voltage/booster voltage, without overburdening the control unit, the booster condenser or other electric components of the fuel injection system.

The increased opening speed of the magnet valve that is caused by the increased booster current causes that the beginning of the injection can be determined more precisely and that the delay, which adjusts between the application of the booster voltage and the opening of the injector, scatters between several exemplars of injectors that have been produces in series only in a minor extent. As a result of this the flowing of the increased booster current at the beginning of the controlling of the magnet valve causes a further increased precision of the fuel metering.

It furthermore proved to be advantageous if the increased control current/booster current is lowered at the beginning of the controlling of the magnet valve on the initial value during partial load or full load operation of the combustion engine, if at least one operating parameter of the combustion engine exceeds a second default threshold value. Thereby it is provided that the increased control current at the beginning of the controlling of the magnet valve is only applied in the presence of defined operating conditions of the combustion engine, so that it does not come to a overburdening of individual components of the fuel injection system.

It proved to be especially advantageous, if the engine speed of the combustion engine and/or a pressure in the common-rail are used as operating parameters for controlling the magnet valve of the combustion engine. Thereby it is for example possible to lower the control current at the end of the controlling of the magnet valve as soon as the engine speed of the combustion engine falls below a first default threshold value. Similarly also the pressure in the common-rail can be used to cause the change from one operating status to another, because the pressure in the common-rail has a lower value during no-load running than during partial or full load operation of the combustion engine.

The energy or power, with which the magnet valve is impinged at the end of the controlling, can be controlled advantageously by an on-off control of the holding current. Naturally also other power controls or current controls that are known from the state of the art are applicable.

Because the pressure in the common-rail and therefore also in the injectors ate relatively low during the lower partial load or during the no-load running of the combustion engine and because the injection time are very short, it proved to be advantageous if the controlling of the magnet valve with a holding current follows directly after the controlling of the magnet valve with the booster current. This means that the controlling of the magnet valve with a starting current can be waived. Thereby the control unit is discharged. Because the pressure in the common-rail or in the injector is relatively low during no-load running of the combustion engine, the controlling of the magnet valve with a booster voltage is sufficient in order to achieve a reliable opening of the magnet valve.

This is not the case during full or partial load operation of the combustion engine with significantly higher common-rail pressures, so that after the controlling of the magnet valve with a booster voltage a starting phase is required, in which the magnet valve is controlled with a starting current, which is higher than the holding current.

Further advantages and advantageous embodiments of the invention can be taken from the flowing drawing, its description and the patent claims. All advantages that are named in the drawing, the description and the patent claims can be fundamental to the invention by themselves or in a random combination of each other.

DETAILED DESCRIPTION

A further advantage of the invention lays in the fact that small injection amounts can be injected without any constructive changes of the injector or the magnet valve.

Figures 1, 2:
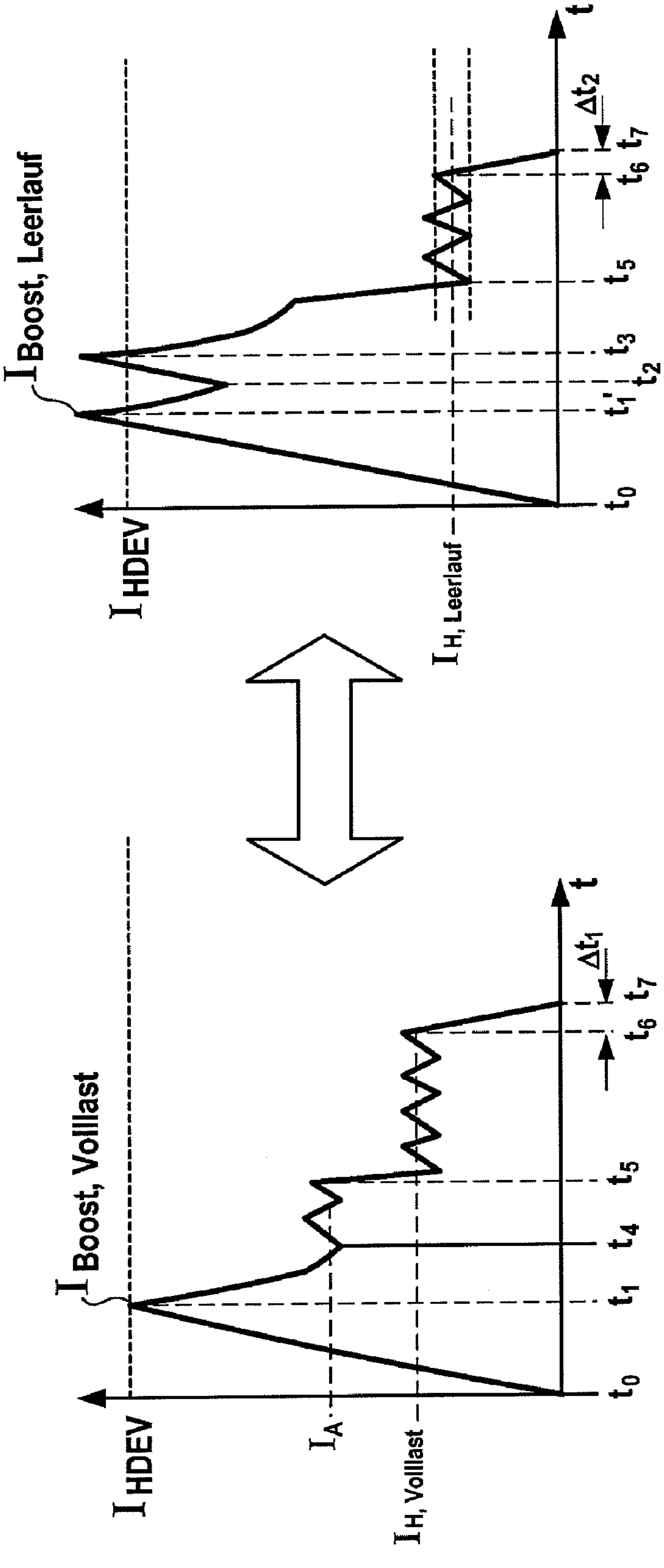
FIG. 1 shows the controlling of a magnet valve during partial or full load operation.
FIG. 2 shows the controlling of the magnet valve according to the invention during low partial load operation or during no-load running.
Figure 3:
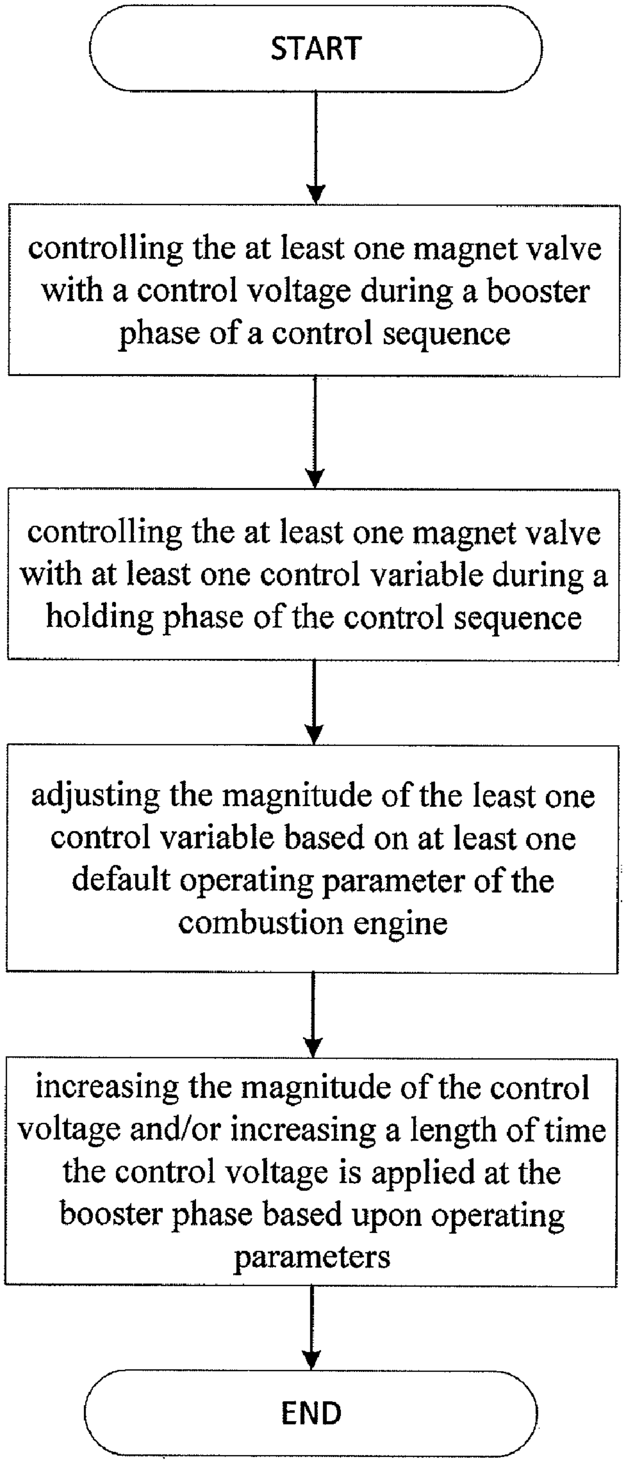
FIG. 3 shows a flow chart illustrating one embodiment of an operation of a method according to the invention.

FIG. 1 shows a procedure for controlling a magnet valve as it is known from DE 198 33 830. The circuit arrangement of this controlling is described in detail in the named print.

Because the invention does not require any hardware changes as compared to the controlling of the magnet valve that is described in DE 198 33 830, it is referred to the description of the hardware in DE 198 33 830.

The controlling of the magnet valve starts at the point of time $t_0$. At the beginning of time $t_0$ until the point of time $t_1$ the magnet valve is impinged with a booster voltage $U_{boost}$. The booster voltage $U_{boost}$ during a medium partial or full load operation of the combustion engine can typically be 65 V. As a result of this a very high current $I_{boost\ full\ load}$ flows, which leads to a quick building of the magnetic field in the magnet valve. At the end of the booster phase at the time t1 it is not provided that the magnet valve is already opened.

For this reason the magnet valve is impinged with a starting current $I_A$ during partial or full load operation after this first phase, which is also called booster phase. The starting current $I_A$ is measured in a way that it is made sure that the magnet valve is completely opened during highest rail pressure and therefore an injection process is started.

At the point of time t5 when it is made sure that the magnet valve is opened, the current, with which the magnet valve is controlled, can be reduced to a holding current $I_H$. During holding phase, which begins at the point of time $t_5$ and ends at the point of time $t_6$, the holding current $I_{H\ full\ load}$ is regulated onto a desired value by an on-off control. If the injection has to be ended, the holding current $I_{H\ full\ load}$ is turned off and the magnetic field degrades in the magnet valve. At the point of time $t_7$ the magnet valve is closed. The time between the end of the controlling of the magnet valve and the closing of the magnet valve is labeled in FIG. 1 with $\Delta t_1$.

FIG. 2 shows the invention for controlling a magnet valve during low partial load or no-load running. Thereby the ordinate is shown with the same scale as the ordinate in FIG. 1.

Beginning at the point of time to the magnet valve is also controlled with the booster voltage $U_{boost}$ during no-load running, whereby the booster voltage $U_{boost}$ is applied longer at the magnet valve until the increased booster current $I_{boost\ no\text{-}load}$ is reached. Because the booster phase is extended during no-load running of the combustion engine a higher loading current flows at the end of the booster phase ($t=t_1$) as compared to the loading current of the magnet valve at the time $t=t_1$ when controlling during partial or full load operation (see FIG. 1).

In the embodiment that is showed in FIG. 2 a booster voltage $U_{boost}$ is again applied at the magnet valve between the time interval $t=t_2$ and $t=t_3$. The second application of the booster voltage $U_{boost}$ is optional. If there are many case of application the one time application of the booster voltage $U_{boost}$ is sufficient.

By applying the booster voltage $U_{boost}$ at the magnet valve one or several times a fast opening of the magnet valve is achieved and it is made sure that the magnet valve is completely opened at the end of the booster phase.

Because the magnet valve is already completely opened at the point of time t1, the latest at the point of time $t_3$, the application of a starting current $I_A$ can be waived during no-load running of the combustion engine. At the point of time $t_5$ the magnet valve is controlled by a holding current $I_{H\ no\text{-}load}$ that is reduced compared to the current during full load operation. This holding current $I_{H\ no\text{-}load}$ is lower than the holding current $I_{H\ full\ load}$. Thereby the control unit is discharged and, because less energy is stored in the magnetic field of the magnet valve due to the lower holding current $I_{H\ no\text{-}load}$, the magnet valve is closing faster after turning off the holding current $I_{H\,no\text{-}load}$ at the point of time $t=t_6$. This means that the time interval $\Delta t_2$ between the points of time $t_6$ and $t_7$ is smaller than the time interval $\Delta t_1$ (see FIG. 1).

As a result of this firstly a faster opening and therefore a more precise beginning of an injection process is provided by the invention. Secondly also the closing time of the magnet valve is reduced by the holding current that is reduced compared to the current during partial or full load operation, which has a positive effect on the precision of the ending of the injection process.

Besides the control unit is discharged, because the phase between the points of time $t_4$ and $t_5$, in which the magnet valve is impinged with the starting current $I_A$ during partial or full load operation, can be waived without substitution.

The invention claimed is:

1. A method of controlling at least one magnet valve for regulating an injection of fuel into a combustion engine, the method comprising:

- controlling the at least one magnet valve with a control voltage during a booster phase of a control sequence;
- controlling the at least one magnet valve with at least one control variable during a holding phase of the control sequence;
- adjusting the magnitude of the least one control variable based on at least one default operating parameter of the combustion engine, wherein the at least one control variable and the control voltage influences the energy and/or power that impinges the at least one magnet valve;
- increasing the magnitude of the control voltage and/or increasing a length of time the control voltage is applied at the booster phase, as opposed to an initial status, upon at least one operating parameter of the combustion engine falling below a first default threshold value during a partial or a full load operation of the combustion engine; and
- adjusting the magnitude of the at least one control variable to an increased value at the holding phase upon at least one of the operating parameters exceeding a second default threshold value, wherein the increased value is greater in magnitude in comparison to the initial value during the partial or full load operation of the combustion engine.

2. A method according to claim 1, further comprising adjusting the magnitude of the at least one control variable to a reduced value at the holding phase upon a decrease in magnitude of at least one of the operating parameters below the first default threshold value, wherein the reduced value is lower in magnitude in comparison to an initial value during a partial or a full load operation of the combustion engine.

3. A method according to claim 1, further comprising applying an increased control voltage to the at least one magnet valve at a plurality of times over the duration of the control sequence.

4. A method according to claim 3, further comprising decreasing the magnitude of the control voltage that is applied for an increased length of time at the booster phase upon at least one of the operating parameters of the combustion engine exceeding the second default threshold value during a partial or a full load operation of the combustion engine.

5. A method according to claim 1, further comprising using an engine speed of the combustion engine and/or a pressure in a common-rail as an operating parameter for controlling the at least one magnet valve.

6. A method according to claim 1, further comprising controlling a holding current that is applied to the at least one magnet valve at the holding phase by an on-off control.

7. A method according to claim 6, further comprising controlling the at least one magnet valve with the holding current directly following a controlling of the at least one magnet valve with the increased control voltage.

8. A computer program with a program code stored on a computer-readable storage medium to implement, if the program is executed on a control unit, a method of controlling at least one magnet valve for regulating an injection of fuel into a combustion engine, the method comprising: controlling the at least one magnet valve with a control voltage during a booster phase of a control sequence; controlling the at least one magnet valve with at least one control variable during a holding phase of the control sequence; adjusting the magnitude of the at least one control variable based on at least one default operating parameter of the combustion engine, wherein the at least one control variable and the control voltage influences the energy and/or power that impinges the at least one magnet valve; increasing the magnitude of the control voltage and/or increasing a length of time the control voltage is applied at the booster phase, as opposed to an initial status, upon at least one operating parameter of the combustion engine falling below a first default threshold value during a partial or a full load operation of the combustion engine; and adjusting the magnitude of the at least one control variable to an increased value at the holding phase upon at least one of the operating parameters exceeding a second default threshold value, wherein the increased value is greater in magnitude in comparison to the initial value during the partial or full load operation of the combustion engine.

9. A control unit for executing a method of controlling at least one magnet valve for regulating an injection of fuel into a combustion engine, the method comprising: controlling the at least one magnet valve with a control voltage during a booster phase of a control sequence; controlling the at least one magnet valve with at least one control variable during a holding phase of the control sequence; adjusting the magnitude of the least one control variable based on at least one default operating parameter of the combustion engine, wherein the at least one control variable and the control voltage influences the energy and/or power that impinges the at least one magnet valve; and adjusting the magnitude of the at least one control variable to an increased value at the holding phase upon at least one of the operating parameters exceeding a second default threshold value, wherein the increased value is greater in magnitude in comparison to the initial value during the partial or full load operation of the combustion engine.

* * * * *